(12) United States Patent
Hein et al.

(10) Patent No.: US 9,018,811 B2
(45) Date of Patent: Apr. 28, 2015

(54) ELECTRONICALLY COMMUTATED ELECTRIC MOTOR HAVING REDUCED INTERFERENCE EMISSION

(75) Inventors: Bernd Hein, Balersbronn/Schoenmuenzach (DE); Christoph Heier, Iffezheim (DE); Karlheinz Lunghard, Buehl (DE); Jerome Thiery, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 13/513,602

(22) PCT Filed: Oct. 6, 2010

(86) PCT No.: PCT/EP2010/064875
§ 371 (c)(1),
(2), (4) Date: Aug. 16, 2012

(87) PCT Pub. No.: WO2011/067015
PCT Pub. Date: Jun. 9, 2011

(65) Prior Publication Data
US 2012/0299413 A1    Nov. 29, 2012

(30) Foreign Application Priority Data

Dec. 3, 2009  (DE) .......................... 10 2009 047 461

(51) Int. Cl.
| | |
|---|---|
| H02K 3/50 | (2006.01) |
| H02K 5/22 | (2006.01) |
| H02K 3/52 | (2006.01) |
| H02K 11/00 | (2006.01) |

(52) U.S. Cl.
CPC ............... *H02K 5/225* (2013.01); *H02K 3/525* (2013.01); *H02K 11/0089* (2013.01)

(58) Field of Classification Search
USPC ................. 310/71, 257, 49.02, 49.11, 49.13, 310/49.14, 49.21, 49.31
IPC ......................................... H02K 3/50
See application file for complete search history.

(56) References Cited

U.S. PATENT DOCUMENTS

| | | | |
|---|---|---|---|
| 5,977,670 A * | 11/1999 | Numaya et al. ................. 310/71 |
| 6,100,612 A * | 8/2000 | Satoh ......................... 310/49.01 |
| 6,492,751 B1 | 12/2002 | Ineson et al. |
| 7,151,333 B2 * | 12/2006 | Suzuki et al. .................. 310/71 |

(Continued)

FOREIGN PATENT DOCUMENTS

| | | |
|---|---|---|
| CN | 1451198 | 10/2003 |
| GB | 2445775 | 7/2008 |

(Continued)

OTHER PUBLICATIONS

PCT/EP2010/064875 International Search Report dated Mar. 18, 2011 (Translation and Original, 4 pages).

*Primary Examiner* — Dang Le
(74) *Attorney, Agent, or Firm* — Michael Best & Friedrich LLP

(57) ABSTRACT

The invention relates to a stator assembly (7) for an electric motor (1), in particular for a rotatory claw pole motor, including: an electrically conductive stator (8, 9) having a winding channel extending in the circumferential direction; a stator winding (6) extending in the winding channel; feed lines (5) for electrically contacting the stator winding (6); and a contact element (13) that electrically connects one of the feed lines (5) to the stator.

18 Claims, 2 Drawing Sheets

(56) References Cited

U.S. PATENT DOCUMENTS 8,026,641 B2 * 9/2011 Lee .......................... 310/49.18
2008/0088187 A1 * 4/2008 Shao et al. .................... 310/51

FOREIGN PATENT DOCUMENTS

| | | |
|---|---|---|
| JP | 2005354858 | 12/2005 |
| WO | 2007093544 | 8/2007 |

* cited by examiner

ELECTRONICALLY COMMUTATED ELECTRIC MOTOR HAVING REDUCED INTERFERENCE EMISSION

BACKGROUND OF THE INVENTION

The invention relates to electric motors, in particular electronically commutated electric motors, such as a claw-pole motor, for example.

Electric motors, in particular claw-pole motors, are known from the prior art. Claw-pole motors are used whenever low rotation speeds are required. For example, claw-pole motors are used for water pumps or the like.

Claw-pole motors have two (wound) stator coils running in a circumferential direction which surround a claw arrangement. The claw arrangement represents the stator of the electric motor and comprises stator teeth aligned in the axial direction, with which an alternating magnetic field can be produced. The claw arrangement is generally formed in two parts with subarrangements of magnetic material, with each of the subarrangements having a ring from which stator teeth protrude in the axial direction (i.e. perpendicular to the ring face). Furthermore, each of the subarrangements has on one side, at one end of the stator teeth, a section extending radially outwards.

The subarrangements are designed to be complementary with respect to one another, the outer ends, in a radial direction, of the subarrangements being connected to one another in the assembled state via a ring-shaped lamination in such a way that a magnetic return path is formed between the subarrangements. The claw arrangement forms a toroidal stator, with the stator coils being arranged in the interior of the torus. The claws of the subarrangements engage in one another in the assembled state in such a way that they do not touch one another and have equal distances with respect to one another. Depending on the energization of the stator coils, adjacent claws form a south pole and a north pole, or vice versa.

In general, an armature in the form of a rotor which is generally formed with permanent magnets or from a ferrite material is located in the region surrounded by the claw arrangement of the claw-pole motor. By alternately energizing the stator coils, the polarity of adjacent stator teeth is changed, as a result of which a force is exerted on the rotor and the rotor is driven.

Supplying such an electric motor with an alternating electrical variable results in electromagnetic interference (EMI). Such interference, in particular the emission of electromagnetic radiation by conductors and conducted interference can be brought about by electrical components in the electric motor and by metal component parts which are excited to produce EMI emission as a result of magnetic eddy currents. In general, the emission is reduced by further electrical component parts, such as capacitors and inductor coils, for example, being integrated in the drive circuit or in the electric motor. However, this is involved and increases the susceptibility of the entire system to faults.

Therefore, the object of the present invention is to provide an electronically commutated electric motor in which the EMI emission is reduced.

SUMMARY OF THE INVENTION

In accordance with a first aspect, a stator arrangement for an electronically commutated electric motor, in particular for a rotary claw-pole motor, is provided. The stator arrangement comprises:

an electrically conductive stator with a winding channel running in the circumferential direction;

a stator winding running in the winding channel;

one or more feed lines for making electrical contact with the stator winding; and a contact element, which electrically connects one of the feed lines to the stator.

One concept of the present invention consists in reducing the EMI emission of an electronically commutated electric motor by virtue of connecting the electrically conductive stator, in particular the components with which the stator arrangement is constructed, to one of the feed lines which are used for driving the stator winding. This makes it possible to considerably reduce in particular eddy currents in the stator which are induced by the movement of a rotor.

Furthermore, the stator can have stator teeth extending in an axial direction of the electric motor.

In addition, the contact element can have a contact lamination, which is arranged under tension in order to exert a contact force on the stator and/or the feed line.

The contact element can have a conductor, which is riveted, adhesively bonded, soldered or welded to the stator and/or the feed line.

In accordance with a further aspect, an electric motor is provided with the above stator arrangement.

BRIEF DESCRIPTION OF THE DRAWINGS

Embodiments will be explained in more detail below with reference to the attached drawings in which.

DETAILED DESCRIPTION

Figure 1:
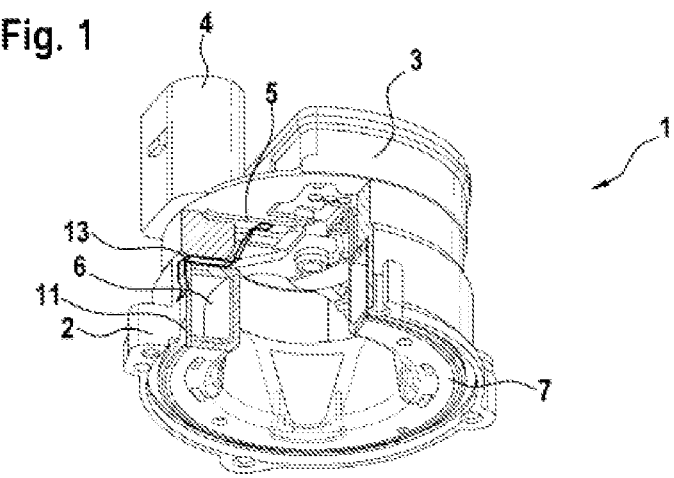
FIG. 1 shows a detail illustration of a claw-pole motor.

FIG. 1 shows a perspective illustration of a claw-pole motor 1, which is arranged in a housing 2. A control unit 3 is arranged on the housing 2 and is supplied with electrical power via a plug-type connection 4. The control unit 3 generates an electrical drive variable for electrically driving the claw-pole motor 1. For this purpose, feed lines 5 are provided between the control unit 3 and stator coils 6 of the claw-pole motor 1.

The feed lines 5 represent connecting lines between the control unit 3 and stator coils 6 for transmitting the electrical drive variable. The connecting lines can be in the form of stamped sheet metal or the like, for example.

Figure 2:
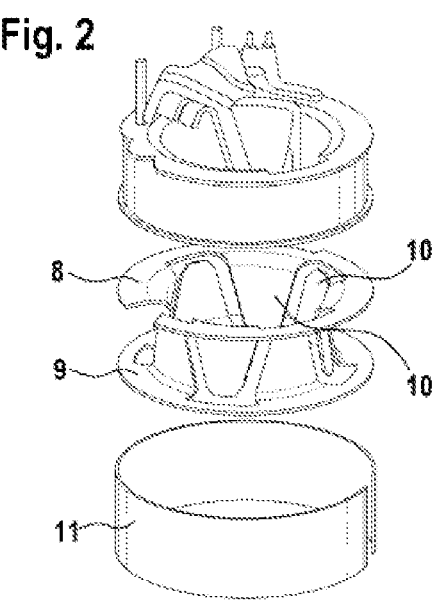
FIG. 2 shows an exploded illustration of the claw-pole motor shown in FIG. 1.
Figure 3:
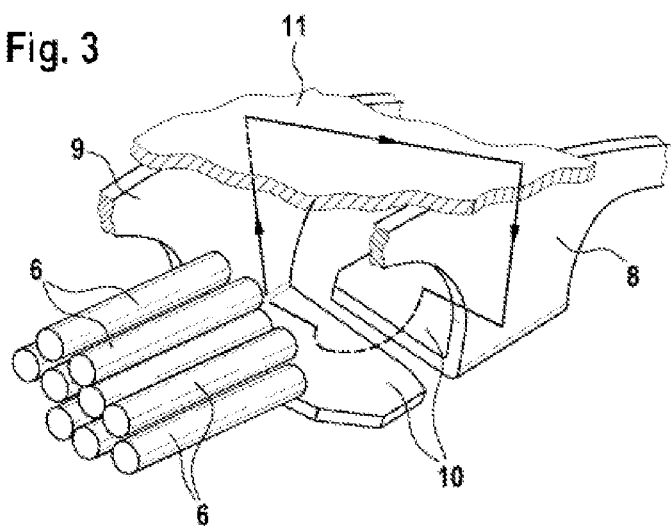
FIG. 3 shows a detail of the stator of the claw-pole motor shown in FIG. 1.

An annular or toroidal stator arrangement 7, which is illustrated in more detail in the illustrations shown in FIGS. 2 and 3, is located in the housing 2. The stator arrangement 7 has a first claw element 8 and a second claw element 9, which each have an annular section which defines mutually opposite lateral limits of the toroidal stator body in the axial direction.

The annular section of each of the claw elements 8, 9 has claws 10. Each of the claws 10 has an outwardly tapering form and is arranged in a segment of the annular section on a radially inner edge of the annular section. Each of the claws 10 extends in the axial direction. The claws 10 form the stator teeth. The claws 10 are arranged on the two claw elements 8, 9 in such a way that they engage in one another in the assembled state of the claw elements 8, 9 without coming into contact with one another. As a result, an air gap 12 remains between adjacent claws, i.e. claws 10 which are adjacent to one another in the circumferential direction are not in direct contact with one another.

In order to ensure a magnetic return path, the claw elements 8, 9 are preferably connected to one another at their radially outer edge via a cylindrical magnetic return path ring 11. Therefore, a channel for the two stator coils 6 is formed between the claws 10, the annular sections of the claw elements 8, 9 and the magnetic return path ring 11.

The stator coils 6 are wound in the circumferential direction in this channel and therefore surround a rotor (not shown) concentrically, it being possible for said rotor to be arranged in the interior of the stator 7. The two stator coils 6 are each energized alternately only in one direction, the current directions in the stator coils 6 being in opposition to one another. In other words, the control unit 3 drives the stator coils 6 periodically in such a way that a first of the stator coils 6 is energized with a drive variable during a first time period, such that a magnetic field is formed between adjacent claws 10. During a second time period, a second of the stator coils 6 is energized with a drive variable, with a current flowing through the second stator coil 6 in an opposite direction with respect to the circumferential direction of the stator arrangement 7. Depending on the choice of stator coil 6 energized at that time, a magnetic field with a specific direction is formed in the vicinity of the air gap 12 between the claws 10, said magnetic field interacting with the rotor such that said rotor is driven. For this purpose, the rotor can have permanent magnets or can be manufactured from a ferrite material, in particular from a plastoferrite material.

The claw elements 8, 9 and the magnetic return path ring 11 are formed from a metal material, preferably from metal sheets, and are therefore conductive. Owing to the magnetic field produced by the stator coils 6, eddy currents can form in the metal sheets, which can result in EMI emission of the stator. For this reason, provision is made for the stator arrangement 7 surrounding the stator coils 6 to be electrically connected to one of the feed lines 5. For this purpose, an electrically conductive contact element 13 is provided, which electrically connects the feed line 5 to the stator arrangement 7.

Figure 4:
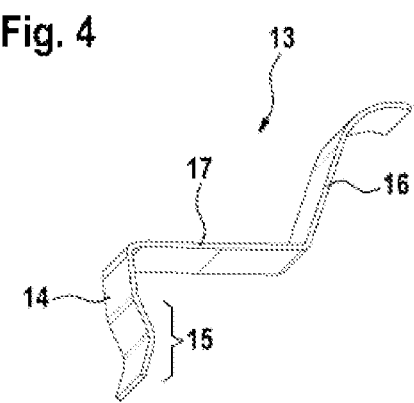
FIG. 4 shows a contact-making element for producing an electrical connection between an electrical supply and the stator arrangement.

In accordance with one embodiment, the contact element 13, as illustrated in FIG. 4, can be in the form of an electrically conductive contact lamination. The contact lamination can have a first limb 14, which can be arranged between an inner wall of the housing 2 and the stator arrangement 7 held therein, in particular the magnetic return path ring 11 of the stator arrangement 7. The first limb element 14 can have a deformation 15, for example, which is arranged, under tension, between the inner wall of the housing 2 and the magnetic return path ring 11 in the installed state. As a result, an elastic force acts between the housing 2 and the magnetic return path ring 11, as a result of which contact is made with the stator arrangement 7 electrically via the contact element 13.

In particular, the deformed section 15 can be in the form of a V, with the first limb section 14 being arranged under tension in such a way that the apex of the V-shaped section 15 presses against the magnetic return path ring 11 in order to make electrical contact therewith. Alternatively, the apex of the V-shaped section 15 can also press against the housing 2.

The housing 2 is preferably nonconductive, with the result that the external environment of the claw-pole motor can be insulated from the drive variables.

The contact element 13 also has a second limb section 16, which presses elastically onto one of the feed lines 5 in the installed state. For this purpose, the feed line 5 in question is arranged at one end of the stator arrangement 7 in the axial direction, with the result that the limb sections 14, 16 enclose an obtuse angle, a right angle or an acute angle. The contact element 13 is fixed via a holding section 17, which is arranged between one of the annular sections of one of the claw elements 8, 9 and a corresponding housing section which is opposite the corresponding annular section, in order to fix the contact element 13 reliably in the housing 2 and to ensure the contact-pressure force for the second limb section 16.

The contact between one of the feed lines 5 and the stator arrangement 7 can furthermore be produced using a soldered or welded wire connection, via an electrically conducting film which is adhesively bonded to the corresponding feed line 5 and the stator arrangement 7, via an electrically conducting varnish which is provided between the feed line 5 and the stator arrangement 7 or the like.

The contact element 13 can be connected to the stator arrangement 7 also via a suitable connection, such as by means of riveting, welding or soldering, for example.

The electrical connection between the stator arrangement and one of the feed lines 5 results in markedly reduced electromagnetic interference emission of the claw-pole motor, although an alternating electrical variable is applied to the stator arrangement 7.

The invention claimed is:

1. A stator arrangement (7) for an electric motor (1), comprising:
   an electrically conductive stator (8, 9) with a winding channel running in a circumferential direction;
   a stator winding (6) running in the winding channel;
   a control unit (3) operable to generate an electrical drive variable;
   feed lines (5) extending from the control unit (3) to the stator winding (6) for supplying the electrical drive variable to the stator winding (6); and
   a contact element (13), which electrically connects one of the feed lines (5) to the stator.

2. The stator arrangement (7) as claimed in claim 1, the stator (8, 9) having stator teeth (10) extending in an axial direction of the electric motor (1).

3. The stator arrangement (7) as claimed in claim 2, the contact element (13) having a contact lamination, which is arranged under tension in order to exert a contact force on the stator (8, 9).

4. The stator arrangement (7) as claimed in claim 2, the contact element (13) having a conductor, which is riveted, adhesively bonded, soldered or welded to the stator (8, 9).

5. The stator arrangement (7) as claimed in claim 1, the contact element (13) having a contact lamination, which is arranged under tension in order to exert a contact force on the stator (8, 9).

6. The stator arrangement (7) as claimed in claim 1, the contact element (13) having a conductor, which is riveted, adhesively bonded, soldered or welded to the stator (8, 9).

7. An electric motor (1) with a stator arrangement (7) as claimed in claim 1.

8. A motor as claimed in claim 7, the stator (8, 9) having stator teeth (10) extending in an axial direction of the electric motor (1).

9. A motor as claimed in claim 7, the contact element (13) having a contact lamination, which is arranged under tension in order to exert a contact force on the stator (8, 9).

10. A motor as claimed in claim 7, the contact element (13) having a conductor, which is riveted, adhesively bonded, soldered or welded to the stator (8, 9).

11. A motor as claimed in claim 7, the contact element (13) having a contact lamination, which is arranged under tension in order to exert a contact force on the feed line (5).

12. A motor as claimed in claim 7, the contact element (13) having a contact lamination, which is arranged under tension in order to exert a contact force on the stator (8, 9) and the feed line (5).

13. A motor as claimed in claim 7, the contact element (13) having a conductor, which is riveted, adhesively bonded, soldered or welded to the feed line.

14. A motor as claimed in claim 7, the contact element (13) having a conductor, which is riveted, adhesively bonded, soldered or welded to the stator (8, 9) and the feed line.

15. The stator arrangement (7) as claimed in claim 1, the contact element (13) having a contact lamination, which is arranged under tension in order to exert a contact force on the feed line (5).

16. The stator arrangement (7) as claimed in claim 1, the contact element (13) having a contact lamination, which is arranged under tension in order to exert a contact force on the stator (8, 9) and the feed line (5).

17. The stator arrangement (7) as claimed in claim 1, the contact element (13) having a conductor, which is riveted, adhesively bonded, soldered or welded to the feed line.

18. The stator arrangement (7) as claimed in claim 1, the contact element (13) having a conductor, which is riveted, adhesively bonded, soldered or welded to the stator (8, 9) and the feed line.

\* \* \* \* \*